United States Patent
Heikkila et al.

(10) Patent No.: US 11,186,693 B2
(45) Date of Patent: Nov. 30, 2021

(54) FIBER POLYMER COMPOSITE

(71) Applicant: Tundra Composites, LLC, White Bear Lake, MN (US)

(72) Inventors: Kurt Emil Heikkila, Marine on the St. Croix, MN (US); Bruce Bohnen, Roseville, MN (US); Adam Bartel, St. Paul, MN (US)

(73) Assignee: Tundra Composits, LLC, White Bear Lake, MN (US)

( * ) Notice: Subject to any disclaimer, the term of this patent is extended or adjusted under 35 U.S.C. 154(b) by 116 days.

(21) Appl. No.: 16/543,752

(22) Filed: Aug. 19, 2019

(65) Prior Publication Data

US 2020/0115516 A1    Apr. 16, 2020

Related U.S. Application Data

(62) Division of application No. 15/348,249, filed on Nov. 10, 2016, now Pat. No. 10,414,886.

(60) Provisional application No. 62/254,303, filed on Nov. 12, 2015.

(51) Int. Cl.
    *C08J 5/08*      (2006.01)
    *C03C 25/47*      (2018.01)
    *C08K 7/02*      (2006.01)

(52) U.S. Cl.
    CPC ............... *C08J 5/08* (2013.01); *C03C 25/47* (2018.01); *C08K 7/02* (2013.01); *C08J 2327/06* (2013.01); *C08J 2327/20* (2013.01); *C08J 2327/24* (2013.01); *C08J 2355/02* (2013.01)

(58) Field of Classification Search
    CPC ...... C08J 5/08; C08J 2327/06; C08J 2327/20; C08J 2355/02; C03C 25/47; C08K 7/02
    USPC .......................................................... 523/217
See application file for complete search history.

(56) References Cited

U.S. PATENT DOCUMENTS

| | | |
|---|---|---|
| 4,767,817 A | 8/1988 | Lee |
| 4,801,627 A | 1/1989 | Rahrig et al. |
| 4,870,126 A | 9/1989 | Kinson et al. |
| 4,874,858 A | 10/1989 | Magistro |
| 5,008,145 A | 4/1991 | Kinson et al. |
| 5,153,241 A | 10/1992 | Beshay |
| 5,804,313 A | 9/1998 | Schell |
| 5,981,067 A | 11/1999 | Seethamraju et al. |
| 6,093,359 A | 7/2000 | Gauchel et al. |
| 6,384,128 B1 | 5/2002 | Wadahara et al. |
| 7,198,840 B2 | 4/2007 | Lee et al. |
| 8,629,203 B2 * | 1/2014 | Hawrylko ............... C08J 5/06 524/13 |
| 2016/0096934 A1 | 4/2016 | Heikkila et al. |
| 2021/0054184 A1* | 2/2021 | Bartel ...................... C08J 5/047 |

FOREIGN PATENT DOCUMENTS

| | | |
|---|---|---|
| EP | 0747419 A3 | 7/1997 |
| JP | 2015081296 A | 4/2015 |

\* cited by examiner

*Primary Examiner* — Hannah J Pak
(74) *Attorney, Agent, or Firm* — Mark DiPietro; Fred C. Morgan

(57) ABSTRACT

The claimed material relates to a fiber and polymer composite having enhanced modulus, viscoelastic and rheological properties.

12 Claims, 2 Drawing Sheets

FIBER POLYMER COMPOSITE

CROSS REFERENCE TO OTHER APPLICATIONS

This application claims the benefit of a U.S. patent application Ser. No. 15/348,249, filed Nov. 10, 2016. U.S. patent application Ser. No. 15/348,240 claims the benefit of U.S. Provisional Patent Application Ser. No. 62/254,303 filed Nov. 12, 2015. Both applications are hereby incorporated by reference in their entirety.

FIELD

Disclosed is a composite of a fiber and a polymer. The composite has improved process characteristics, improved structural product properties including modulus to produced enhanced products. The novel properties are produced in the composite by novel interactions of the fiber and polymer components.

BACKGROUND

Composite materials have been made for many years by combining generally two dis-similar materials to obtain beneficial properties from both. A true composite is unique because the interaction of the component materials provides the best properties and characteristics of both components. Many types of composite materials are known. The use of a reinforcing fiber produces a range of materials and, under the correct conditions, can form a true polymer composite. In contrast, a simple filled polymer, with additive or filler, cannot display composite properties. Fillers are often simple replacements for a more expensive component in the composition.

Substantial attention has been paid to the creation of composite materials with unique properties. Fiber reinforced polymer materials such as glass reinforced (GFR) polyvinyl chloride (PVC) have been developed for a variety of end uses. Developing such materials have faced difficult barriers. In order to obtain significant modulus properties, a composite needs to maximize the reinforcing fiber loading. Highly filled composite materials cannot be easily made without thermal depolymerization of the polymer and accompanying hazards of fire and toxic gasses. In the past the polymers have been stabilized using additive materials. Without improved modulus, GFR composites are not fully suited to many demanding structural end uses. Rahrig et al., U.S. Pat. No. 4,801,627 and Kenson et al., U.S. Pat. No. 5,008,145 teaches that useful GFR is made by combining glass fiber, polyvinyl chloride, a reactive coupler and a stabilizer to prevent dehydrohalogenation. Lee et al. U.S. Pat. No. 7,198,840 discloses a profile extruded article made of fiber reinforced polymer of vinyl-chloride monomer with amino coupling agents and other additives. Beshay U.S. Pat. No. 5,152,341 discloses cellulose fiber composites. D'Souza US Pat Pub 2005/0238864 discloses glass bubble composites that can contain some fiber. As a whole, the glass fiber and other fiber composites, while disclosing high fiber loadings, have not been able to achieve much greater than 50 vol. % fiber and are commonly less than 30 vol. % in polymer composite materials.

While a substantial amount of work has been done regarding fiber reinforced polymer composite materials. A substantial need exists for a composite material that has improved processing at high fiber loadings and improved structural properties.

BRIEF DESCRIPTION

A composite of a fiber and a polymer has improved and novel properties. The claimed composite is made of a combination of a thermoplastic polymer and an interfacial modified fiber (a fiber with a substantially complete coating of an interfacial modifier (IM) with a coating thickness of less than 1000 Angstroms often less than 200 Angstroms). The composite properties result from a selection of fiber type and size, polymer type, molecular weight, viscoelastic character and processing conditions. The resulting composite materials exceed the contemporary structural composites in packing, surface inertness, processability and physical modulus. In the process of making the composite, the fiber input to the compounding process unit can have an arbitrary length, often about 0.8 to 100 mm. The product output of the compounding process unit can have a fiber of similar length, depending on process conditions. The fiber can be reduced in length if sheared in compounding. The composite containing the fiber can be pelletized. In the pellet, the fiber cannot be longer than the major dimension of the pellet. For the purpose of this disclosure the term "fiber" means the fiber (and fiber dimensions) as used as fiber input to the compounding process unit and does not refer to the fiber (and fiber dimensions) in the resulting compounded composite or to the fiber (and fiber dimensions) in a pelletized composite.

One aspect of the claimed material is a composite of interfacially modifier coated fiber and polymer. In this aspect the composite fiber comprises a combination of a cellulosic fiber and a glass fiber. The composite cellulosic fiber can be a wood fiber. The composite comprises a major proportion of cellulosic fiber and a minor proportion of a glass fiber.

Another aspect is a structural member made of the composite. Such structural members can be used in fenestration units including windows and doors in commercial and residential construction.

Still another aspect is a pellet that can be used as an intermediate between the compounding of the composite and the manufacturing of the final product. The pellet can be made of the composite and can be formed as the composite is compounded. As the composite is formed and extruded from the compounder the pellet can be cut into pellets useful in thermoplastic part manufacture. Pellets are typically about 2 to 20 mm in length and about 3 to 25 mm in maximum cross sectional dimension. In a cylindrical pellet the diameter can be about 3 to 20 mm.

A final aspect of the claimed material is a method of compounding the composite by compounding the combined polymer resin and interfacial modified fiber under thermoplastic conditions.

As used in this disclosure the term "fiber" means a fibrous material input to a compounding process unit. The fiber material has a cross-section dimension (preferably but not limited to a diameter) of at least about 0.8 micron often about 1-150 microns and can be 2-100 microns a length of 0.1-150 mm, often 0.2-100 mm, and often 0.3-20 mm and can have an aspect ratio of at least 90 often about 100-1500. These aspect ratios are typical if the input is to the compounder. After pellets are formed the aspect ratio is set by the pellet dimensions.

Fiber as used in a discontinuous phase can be free of a particle or particulate.

Particle, or a collection of particles known as a particulate, is a discrete object having a particle size about 0.1-500 microns, an aspect ratio of less than 5 and a circularity ((circularity, is measured by a view of the two dimensional projection of a particle, and is equal to (perimeter)$^2$/area)) is less than 20.

As used in this disclosure the term "continuous phase" means the polymer matrix into which the fiber is dispersed during compounding.

As used in this disclosure the term "discontinuous phase" means the set of individual fibers that are individually dispersed throughout the continuous phase.

As used in this disclosure the term as used in this disclosure the term "interfacial modifier" means a material that can coat the surface of fiber and does not react with the polymer or other fiber present in the composite. In one embodiment the material is an organo-metallic material.

BRIEF DISCUSSION OF THE DRAWINGS

DETAILED DISCUSSION

Figure 1:
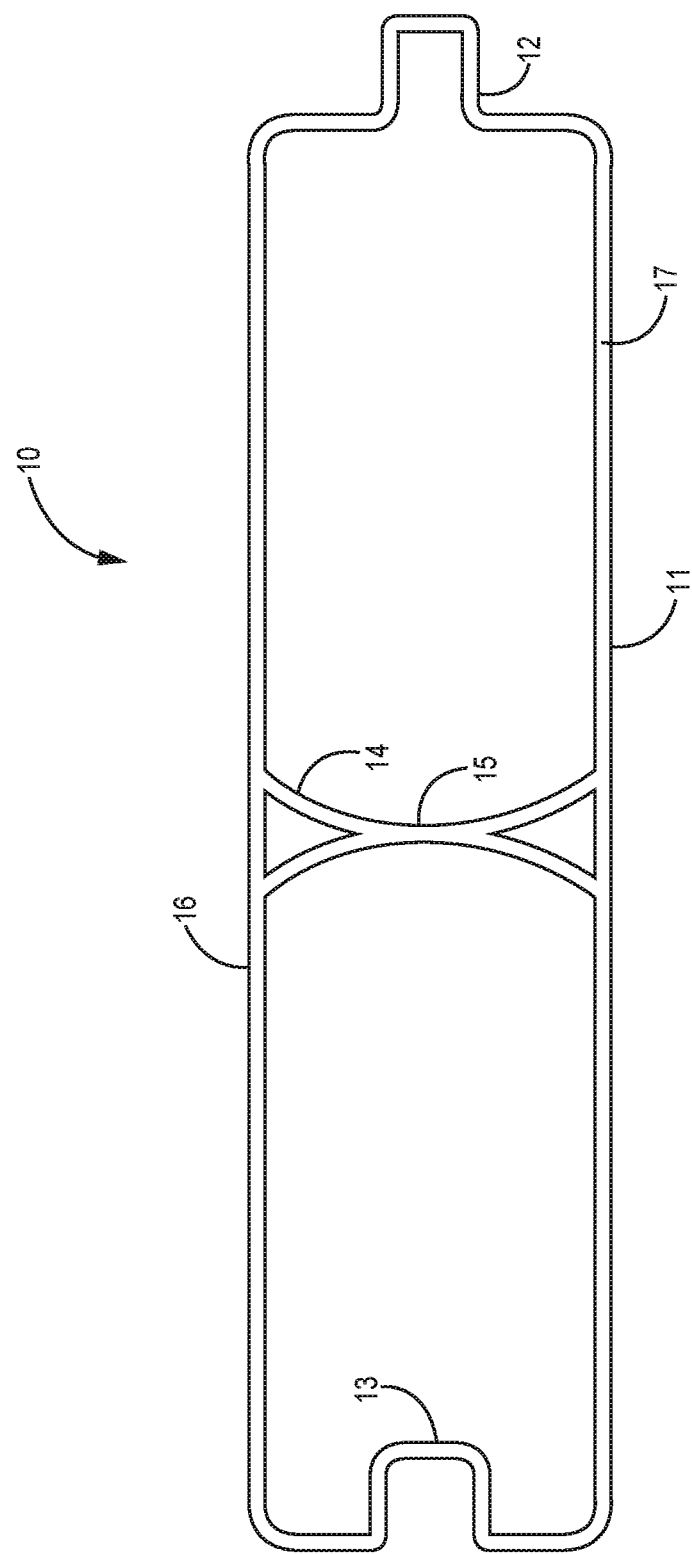
FIG. 1 is a perspective view of an extruded hollow profile structural member. Such a member can be used in siding, decking and fenestration applications.

Novel composites are made by combining an interfacial modified fiber and a polymer to achieve novel physical and process properties.

The fiber is typically coated with an interfacial surface chemical treatment also called an interfacial modifier (IM) that supports or enhances the final properties of the composite such as viscoelasticity, rheology, high packing fraction, and fiber surface inertness. These properties are not present in contemporary composite materials.

A composite is more than a simple admixture. A composite is defined as a combination of two or more substances at various percentages, in which each component results in properties that are in addition to or superior to those of its constituents. In a simple admixture the mixed material has little interaction and little property enhancement. At least one of the materials is chosen to increase stiffness, strength or density. The atoms and molecules in the components of the composite can form bonds with other atoms or molecules using a number of mechanisms. Such bonding can occur between the electron cloud of an atom or molecular surfaces including molecular-molecular interactions, atom-molecular interactions and atom-atom interactions. Each bonding mechanism involves characteristic forces and dimensions between the atomic centers even in molecular interactions. The important aspect of such bonding force is strength, the variation of bonding strength over distance and directionality. The major forces in such bonding include ionic bonding, covalent bonding and the van der Waals' (VDW) types of bonding. Ionic radii and bonding occur in ionic species such as Na$^+$Cl$^-$, Li$^+$F$^-$. Such ionic species form ionic bonds between the atomic centers. Such bonding is substantial, often substantially greater than 100 kJ-mol$^{-1}$ often greater than 250 kJ-mol$^{-1}$. Further, the interatomic distance for ionic radii tend to be small and on the order of 1-3 Å. Covalent bonding results from the overlap of electron clouds surrounding atoms forming a direct covalent bond between atomic centers. The covalent bond strengths are substantial, are roughly equivalent to ionic bonding and tend to have somewhat smaller interatomic distances.

The varied types of van der Waals' forces are different than covalent and ionic bonding. These van der Waals' forces tend to be forces between molecules, not between atomic centers. The van der Waals' forces are typically divided into three types of forces including dipole-dipole forces, dispersion forces and hydrogen bonding. Dipole-dipole forces are a van der Waals' force arising from temporary or permanent variations in the amount or distribution of charge on a molecule.

TABLE 1

Summary of Chemical Forces and Interactions

| Type of Interaction | Strength | Bond Nature | Strength Proportional to: |
|---|---|---|---|
| Covalent bond | Very strong | Comparatively long range | $r^{-1}$ |
| Ionic bond | Very strong | Comparatively long range | $r^{-1}$ |
| Ion-dipole | Strong | Short range | $r^{-2}$ |
| VDW Dipole-dipole | Moderately strong | Short range | $r^{-3}$ |
| VDW Ion-induced dipole | Weak | Very short range | $r^{-4}$ |
| VDW Dipole-induced dipole | Very weak | Extremely short range | $r^{-6}$ |
| VDW London dispersion forces | Very weak $^a$ | Extremely short range | $r^{-6}$ |

$^a$ Since VDW London forces increase with increasing size and there is no limit to the size of molecules, these forces can become rather large. In general, however, they are very weak.

A large variety of polymer and copolymer materials, such as thermoplastic or thermoset polymers, can be used in the composite materials. We have found that polymer materials useful in the composite include both condensation polymeric materials and addition or vinyl polymeric materials. Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The typical polymer has a density of at least 0.85 gm-cm$^{-3}$, however, polymers having a density of greater than 0.96 are useful to enhance overall product density. A density is often up to 1.7 or up to 2 gm-cm$^{-3}$ or can be about 1.5 to 1.95 gm-cm$^{-3}$.

Vinyl polymers include polyacrylonitrile; polymer of alpha-olefins such as ethylene, propylene, etc.; polymers of chlorinated monomers such as vinyl chloride, vinylidene chloride, acrylate monomers such as acrylic acid, methyl acrylate, methyl methacrylate, acrylamide, hydroxyethyl acrylate, and others; styrenic monomers such as styrene, alpha-methyl styrene, vinyl toluene, etc.; vinyl acetate; and other commonly available ethylenically unsaturated monomer compositions. Examples include polyethylene, polypropylene, polybutylene, acrylonitrile-butadiene-styrene (ABS), polybutylene copolymers, polyacetal resins, polyacrylic resins, homopolymers or copolymers comprising vinyl chloride, vinylidene chloride, fluorocarbon copolymers, etc.

Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials. Condensation polymers that can be used in the composite materials include polyamides, polyamide-imide polymers, polyarylsulfones, polycarbonate, polybutylene terephthalate, polybutylene naphthalate, polyetherimides, polyether sulfones, polyethylene terephthalate, thermoplastic polyamides, polyphenylene ether blends, polyphenylene sulfide, polysulfones, thermoplastic polyurethanes and others. Preferred condensation engineering polymers include polycarbonate materials, polyphenyleneoxide materials, and polyester materials including polyethylene terephthalate, polybutylene terephthalate, polyethylene naphthalate and polybutylene naphthalate materials.

Polycarbonate engineering polymers are high performance, amorphous engineering thermoplastics having high impact strength, clarity, heat resistance and dimensional stability. Polycarbonates are generally classified as a polyester or carbonic acid with organic hydroxyl compounds. The most common polycarbonates are based on phenol A as a hydroxyl compound copolymerized with carbonic acid. Materials are often made by the reaction of a biphenyl A with phosgene ($O=CCl_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene, styrene maleic anhydride and others. Preferred alloys comprise a styrene copolymer and a polycarbonate. Preferred polycarbonate materials should have a melt index between 0.5 and 7, preferably between 1 and 5 gm./10 min.

A variety of polyester condensation polymer materials including polyethylene terephthalate, polybutylene terephthalate, polyethylene naphthalate, polybutylene naphthalate, etc. can be useful in the composites. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher $T_g$ and higher stability at high temperature compared to the terephthalate materials. However, all these polyester materials are useful in the composite materials. Such materials have a preferred molecular weight characterized by melt flow properties. Useful polyester materials have a viscosity at 265° C. of about 500-2000 cP, preferably about 800-1300 cP Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly (oxy-(2,6-dimethyl-1,4-phenylene)). Polyphenylene is often used as an alloy or blend with a polyamide, typically nylon 6-6, alloys with polystyrene or high impact styrene and others. A preferred melt index (ASTM 1238) for the polyphenylene oxide material typically ranges from about 1 to 20, preferably about 5 to 10 gm./10 min. The melt viscosity is about 1000 cP at 265° C.

Another class of thermoplastics includes styrenic copolymers. The term styrenic copolymer indicates that styrene is copolymerized with a second vinyl monomer resulting in a vinyl polymer. Such materials contain at least a 5 mol.-% styrene and the balance being 1 or more other vinyl monomers. An important class of these materials is styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitrile (ASA polymer materials) are known. These materials are somewhat softer than unmodified SAN's and are ductile, opaque, two phased terpolymers that have surprisingly improved weatherability.

ASA polymers are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, poly methyl methacrylate and others. An important class of styrene copolymers includes the acrylonitrile-butadiene-styrene monomers. These polymers are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of polymers has a melt index that ranges from about 0.5 to 25, preferably about 0.5 to 20.

Important classes of engineering polymers that can be used include acrylic polymers. Acrylics comprise a broad array of polymers and copolymers in which the major monomeric constituents are an ester acrylate or methacrylate. These polymers are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for polymer grade applications are typically made either in bulk (continuous solution polymerization), followed by extrusion and pelleting or continuously by polymerization in an extruder in which unconverted monomer is removed under reduced pressure and recovered for recycling. Using methyl acrylate, methyl methacrylate, higher alkyl acrylates and other copolymerizable vinyl monomers commonly makes acrylic plastics. Preferred acrylic polymer materials useful in the composites have a melt index of about 0.5 to 50, preferably about 1 to 30 gm./10 min.

Polymer blends or polymer alloys can be useful in manufacturing the claimed pellet or linear extrudate. Such alloys typically comprise two miscible polymers blended to form a uniform composition. Scientific and commercial progress in the area of polymer blends has led to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition-weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties such as viscosity and stability, to permit melt blending with a fiber, permit formation of linear extrudate pellets, and to permit the composition material or pellet to be extruded or injection molded in a conventional thermoplastic process forming the useful product. Engineering polymer and polymer alloys are available from a number of manufacturers including Dyneon LLC, B.F. Goodrich, G.E., Dow, and duPont.

Polyester polymers are manufactured by the reaction of a dibasic acid with a glycol. Dibasic acids used in polyester production include phthalic anhydride, isophthalic acid, maleic acid and adipic acid. The phthalic acid provides stiffness, hardness and temperature resistance; maleic acid provides vinyl saturation to accommodate free radical cure; and adipic acid provides flexibility and ductility to the cured polymer. Commonly used glycols are propylene glycol, which reduces crystalline tendencies and improves solubility in styrene. Ethylene glycol and diethylene glycol reduce crystallization tendencies. The diacids and glycols are condensed eliminating water and are then dissolved in a vinyl monomer to a suitable viscosity. Vinyl monomers include styrene, vinyl toluene, para methyl styrene, methyl methacrylate, and diallyl phthalate. The addition of a polymerization initiator, such as hydroquinone, tertiary butyl catechol or phenothiazine extends the shelf life of the uncured polyester polymer. Polymers based on phthalic anhydride are termed ortho phthalic polyesters and polymers based on isophthalic acid are termed isophthalic polyesters. The viscosity of the unsaturated polyester polymer can be tailored to an application. Low viscosity is important in the fabrication of fiber-reinforced composites to ensure good wetting and subsequent high adhesion of the reinforcing layer to the underlying substrate. Poor wetting can result in large losses of mechanical properties. Typically, polyesters are manufactured with a styrene concentration or other monomer concentration producing polymer having an uncured viscosity of 200-1,000 mPa·s (cP). Specialty polymers may have a viscosity that ranges from about 20 cP to 2,000 cP. Free radical initiators commonly produced using peroxide materials to typically cure unsaturated polyester polymers. Wide varieties of peroxide initiators are available and are commonly used. The peroxide initiators thermally decompose forming free radical initiating species.

The fluorocarbon polymers are per-fluorinated and partially fluorinated polymers made with monomers containing one or more atoms of fluorine, or copolymers of two or more of such monomers. Common examples of thermoplastic fluorinated monomers useful in these polymers or copolymers include hexafluoropropylene (HFP), vinylidene fluoride (VDF), perfluoroalkylvinyl ethers such as perfluoro-(n-propyl-vinyl) ether (PPVE) or perfluoromethylvinylether (PMVE). Other copolymerizable olefinic monomers, including non-fluorinated monomers, may also be present.

Particularly useful materials for the fluorocarbon polymers are TFE-HFP-VDF terpolymers (melting temperature of about 100 to 260° C.; melt flow index at 265° C. under a 5 kg load is about 1-30 g-10 hexafluoropropylene-tetrafluoroethylene-ethylene (HTE) terpolymers (melting temperature about 150 to 280° C.; melt flow index at 297° C. under a 5 kg load of about 1-30 g-10 $\min^{-1}$.), ethylene-tetrafluoroethylene (ETFE) copolymers (melting temperature about 250 to 275° C.; melt flow index at 297° C. under a 5 kg load of about 1-30 g-10 $\min^{-1}$.), hexafluoropropylene-tetrafluoroethylene (FEP) copolymers (melting temperature about 250 to 275° C.; melt flow index at 372° C. under a 5 kg load of about 1-30 g-10 $\min^{-1}$.), and tetrafluoroethylene-perfluoro(alkoxy alkane) (PFA) copolymers (melting temperature about 300 to 320° C.; melt flow index at 372° C. under a 5 kg load of about 1-30 g-10 $\min^{-1}$.). Each of these fluoropolymers is commercially available from Dyneon LLC, Oakdale, Minn. The TFE-HFP-VDF terpolymers are sold under the designation "THV".

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Preferred copolymers are those composed of from at least about 70 and up to 99 mole percent vinylidene fluoride, and correspondingly from about 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 percent trifluoroethylene. Terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers. Such materials are commercially available under the KYNAR trademark from Arkema Group located in King of Prussia, Pa. or under the DYNEON trademark from Dyneon LLC of Oakdale, Minn.

Fluorocarbon elastomer materials can also be used in the composite materials. Fluorocarbon elastomers contain $VF_2$ and HFP monomers and optionally TFE and have a density greater than 1.8 gm-$cm^{-3}$. These polymers exhibit good resistance to most oils, chemicals, solvents, and halogenated hydrocarbons, and excellent resistance to ozone, oxygen, and weathering. Their useful application temperature range is −40° C. to 300° C. Fluorocarbon elastomer examples include those described in detail in Lentz, U.S. Pat. No.

4,257,699, as well as those described in Eddy et al., U.S. Pat. No. 5,017,432 and Ferguson et al., U.S. Pat. No. 5,061,965. The disclosures of each of these patents are totally incorporated herein by reference.

Useful vinyl chloride polymers used in preparing the compositions include the homopolymer of vinyl chloride, i.e. polyvinyl chloride, and copolymers of vinyl chloride with mono-ethylenically unsaturated monomers wherein the copolymer contains at least about 80 percent of the vinyl chloride units. The materials to be copolymerized with vinyl chloride include, but are not restricted to vinyl acetate, vinylidene chloride, diethyl fumarate, methyl methacrylate, meth acrylonitrile, acrylonitrile, styrene, allyl alcohol, ethyl vinyl succinate, allyl ethyl phthalate, vinyl benzoate, allyl acetate, and the like and mixtures thereof. Particularly preferred starting materials comprise polyvinyl chloride and copolymers thereof, vinyl chloride with ethylenically unsaturated esters, vinylidene chloride with styrene and acrylonitrile.

Useful fiber includes both natural and synthetic fibers. Natural fiber includes those of animal or plant origin. Plant based examples include cellulosic materials such as wood fiber, cotton, flax, jute, cellulose acetate etc.; animal based materials made of protein include wool, silk etc. Synthetic fibers include polymer materials such as acrylic, aramid, amide-imide, nylon, polyolefin, polyester, polyurethane, carbon, etc. Other types include glass, metal, or ceramic fibers. Metallic fibers are manufactured fibers of metal, metal coated plastic or a core completely covered by metal. Non-limiting examples of such metal fibers include gold, silver, aluminum, stainless steel and copper. The metal fibers may be used alone or in combinations. The determinant for the selection metal fiber is dependent on the properties desired in the composite material or the shaped article made therefrom. One useful fiber comprises a glass fiber known by the designations: A, C, D, E, Zero Boron E, ECR, AR, R, S, S-2, N, and the like. Generally, any glass that can be made into fibers either by drawing processes used for making reinforcement fibers or spinning processes used for making thermal insulation fibers. Such fiber is typically used as a length of about 0.8-100 mm often about 2-100 mm, a diameter about 0.8-100 microns and an aspect ratio (length divided by diameter) greater than 90 or about 100 to 1500. These commercially available fibers are often combined with a sizing coating. Such coatings cause the otherwise ionically neutral glass fibers to form and remain in bundles or fiber aggregates. Sizing coatings are applied during manufacture before gathering. The sizing minimizes filament degradation caused by filament to filament abrasion. Sizings can be lubricants, protective, or reactive couplers but do not contribute to the properties of a composite using an interfacial modifier coating on the fiber surface.

Dipole structures arise by the separation of charges on a molecule creating a generally or partially positive and a generally or partially negative opposite end. The forces arise from electrostatic interaction between the molecule negative and positive regions. Hydrogen bonding is a dipole-dipole interaction between a hydrogen atom and an electronegative region in a molecule, typically comprising oxygen, fluorine, nitrogen or other relatively electronegative (compared to H) site. These atoms attain a dipole negative charge attracting a dipole-dipole interaction with a hydrogen atom having a positive charge. Dispersion force is the van der Waals' force existing between substantially non-polar uncharged molecules. While this force occurs in non-polar molecules, the force arises from the movement of electrons within the molecule. Because of the rapidity of motion within the electron cloud, the non-polar molecule attains a small but meaningful instantaneous charge as electron movement causes a temporary change in the polarization of the molecule. These minor fluctuations in charge result in the dispersion portion of the van der Waals' force.

Such VDW forces, because of the nature of the dipole or the fluctuating polarization of the molecule, tend to be low in bond strength, typically 50 kJ mol$^{-1}$ or less. Further, the range at which the force becomes attractive is also substantially greater than ionic or covalent bonding and tends to be about 3-10 Å.

In the van der Waals composite materials, we have found that the unique combination of fiber, the varying but controlled size and aspect ratio of the fiber component, the modification of the interaction between the fiber and the polymer, result in the creation of a unique van der Waals' bonding. The van der Waals' forces arise between atoms/crystals and are created by the combination of fiber size, polymer and interfacial modifiers in the composite.

In the past, materials that are characterized, as "composite" have merely comprised a polymer filled with particulate with little or no van der Waals' interaction between the particulate filler material. The interaction between the selection of fiber size distribution and interfacially modified fiber enables the fiber to achieve an intermolecular distance that creates a substantial van der Waals' bond strength. The prior art materials having little viscoelastic properties, do not achieve a true composite structure. This leads us to conclude that this intermolecular distance is not attained in the prior art. In the discussion above, the term "molecule" can be used to relate to a fiber, a fiber comprising non-metal crystal or an amorphous aggregate, other molecular or atomic units or sub-units of non-metal or inorganic mixtures. The van der Waals' forces occur between collections of metal atoms, embodiments of the interfacial modifier, that act as "molecules".

The is characterized by a composite having intermolecular forces between fibers about 30 kJ-mol$^{-1}$ and a bond dimension of 3-10 Å. The fiber in the composite, the reinforcement, is usually much stronger and stiffer than the matrix, and gives the composite its good properties in, for example a shaped article, structural member or other end use. The matrix holds the reinforcements in an orderly high-density pattern. Because the reinforcements are usually discontinuous, the matrix also helps to transfer load among the reinforcements. Processing can aid in the mixing and filling of the reinforcement or fiber. To aid in the mixture, an interfacial modifier can help to overcome the forces that prevent the matrix from forming a substantially continuous phase of the composite. The composite properties arise from the intimate association of interfacially modified fiber and polymer obtained by use of careful processing and manufacture.

An interfacial modifier is an organo-metallic material that provides an exterior coating on the fiber promoting the close association, but not attachment or bonding, of polymer to fiber and fiber to fiber. The composite properties arise from the intimate association of the polymer and fiber obtained by use of careful processing and manufacture. An interfacial modifier is an organic material, in some examples an organo-metallic material, that provides an exterior coating on the fiber to provide a surface that can associate with the polymer promoting the close association of polymer and fiber but with no reactive bonding, such as covalent bonding for example, of polymer to fiber, fiber to fiber, or fiber to a different particulate, such as a glass fiber or a glass bubble. The lack of reactive bonding between the components of the composite leads to the formation of the novel composite—such as high packing fraction, commercially useful rheology, viscoelastic properties, and surface inertness of the fiber. These characteristics can be readily observed when the composite with interfacially modified coated fiber is compared to fiber lacking the interfacial modifier coating. In one embodiment, the coating of interfacial modifier at least partially covers the surface of the fiber. In another embodiment, the coating of interfacial modifier continuously and uniformly covers the surface of the fiber, in a continuous coating phase layer. Minimal amounts of the modifier can be used including about 0.005 to 8 wt.-%, about 0.02 to 6.0, wt. %, about 0.02 to 3.0 wt. %, about 0.02 to 4.0 wt. % or about 0.02 to 5.0 wt. %.

Interfacial modifiers used in the application fall into broad categories including, for example, titanate compounds, zirconate compounds, hafnium compounds, samarium compounds, strontium compounds, neodymium compounds, yttrium compounds, phosphonate compounds, aluminate compounds and zinc compounds. Aluminates, phosphonates, titanates and zirconates that are useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. In embodiments the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

In one embodiment the interfacial modifier that can be used is a type of organo-metallic material such as organo-cobalt, organo-iron, organo-nickel, organo-titanate, organo-aluminate organo-strontium, organo-neodymium, organo-yttrium, organo-zinc or organo-zirconate. The specific type of organo-titanate, organo-aluminates, organo-strontium, organo-neodymium, organo-yttrium, organo-zirconates which can be used and which be referred to as organo-metallic compounds are distinguished by the presence of at least one hydrolysable group and at least one organic moiety. Mixtures of the organo-metallic materials may be used. The mixture of the interfacial modifiers may be applied inter- or intra-fiber, which means at least one fiber may has more than one interfacial modifier coating the surface (intra), or more than one interfacial modifier coating may be applied to different fibers or fiber size distributions (inter). Certain of these types of compounds may be defined by the following general formula:

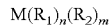

$$M(R_1)_n(R_2)_m$$

wherein M is a central atom selected from such metals as, for example, Ti, Al, and Zr and other metal centers; $R_1$ is a hydrolysable group; $R_2$ is a group consisting of an organic moiety, preferably an organic group that is non-reactive with polymer or other film former; wherein the sum of m+n must equal the coordination number of the central atom and where n is an integer ≥1 and m is an integer ≥1.

Particularly $R_1$ is an alkoxy group having less than 12 C atoms. Other useful groups are those alkoxy groups, which have less than 6 C, and alkoxy groups having 1-3 C atoms. $R_2$ is an organic group including between 6-30, preferably 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic. $R_2$ is substantially unreactive, i.e. not providing attachment or bonding, to other particles or fiber within the composite material.

The use of an interfacial modifier results in workable thermoplastic viscosity and improved structural properties in a final use such as a structural member or shaped article. Minimal amounts of the modifier can be used including about 0.005 to 8 wt.-%, about 0.01 to 6 wt.-%, about 0.02 to 5 wt.-%, or about 0.02 to 3 wt. %. The IM coating can be formed as a coating of at least 3 molecular layers or at least about 50 or about 100 to 500 or about 100 to 1000 angstroms (Å). The claimed composites with increased loadings of fiber can be safely compounded and thermoplastically formed into high strength structural members. The interfacial modification technology depends on the ability to isolate the fibers from continuous polymer phase. The isolation is obtained from a continuous molecular layer(s) of interfacial modifier to be distributed over the fiber surface. Once this layer is applied, the behavior at the interface of the interfacial modifier to polymer dominates and defines the physical properties of the composite and the shaped or structural article (e.g. modulus, tensile, rheology, packing fraction and elongation behavior) while the bulk nature of the fiber dominates the bulk material characteristics of the composite (e.g. density, thermal conductivity, compressive strength). The correlation of fiber bulk properties to that of the final composite is especially strong due to the high volume percentage loadings of discontinuous phase, such as fiber, associated with the technology.

There are two key attributes of the surface coating that dictate the ability to be successfully interfacially modified: 1) the overall surface area of fiber; and 2) fiber surface characteristics that are on the order of the molecular size of the interfacial modifier being applied.

Sizing materials used as glass coatings do not act as interfacial modifiers. Sizing is an essential in glass fiber manufacture and critical to certain glass fiber characteristics determining how fibers will be handled during manufacturing and use. Raw fibers are abrasive and easily abraded and reduced in size. Without sizing, fibers can be reduced to useless "fuzz" during processing. Sizing formulations have been used by manufacturers to distinguish their glass products from competitors' glass products. Glass fiber sizing, typically, is a mixture of several chemistries each contributing to sizing performance on the glass fiber surface. Sizings typically are manufactured from film forming compositions and reactive coupling agents. Once formed, the combination of a film forming material and a reactive coupler forms a reactively coupled film that is, reactively coupled to the glass fiber surface. The sizing protects the fiber, holding fibers together prior to molding but promote dispersion of the fiber when coming into contact with polymer or resin insuring wet out of glass fiber with resin during composite manufacture. Typically, the coupling agent used with the film forming agent, is a reactive alkoxy silane compound serving primarily to bond the glass fiber to their matrix or film forming resin. Silane typically have a silicon containing group and that bonds well to glass (typically $SiO_2$) with a reactive organic end that bonds well to film forming polymer resins. Sizings also may contain additional lubricating agents as well as anti-static agents. We have used sized fibers in our studies and found that sizing does not act as interfacial modifier and we can coat all sizing that we have found.

Aspect Ratio

The benefit of interfacial modification on a fully coated fiber is independent of overall fiber shape. The current upper limit constraint is associated with challenges of successful dispersion of fibers within laboratory compounding equipment without significantly damaging the high aspect ratio fibers. Furthermore, inherent rheological challenges are associated with high aspect ratio fibers. With proper engineering, the ability to successfully compound and produce interfacially modify fibers of fiber fragments with aspect ratio in excess of 20 often in excess of 100, 200 or more is provided.

For composites containing high volumetric loading of fibers, the rheological behavior of the highly packed composites depends on the characteristics of the contact points between the fibers and the distance between fibers. When forming composites with polymeric volumes approximately equal to the excluded volume of the discontinuous phase, inter-fiber interaction dominates the behavior of the material. Fibers contact one another and the combination of interacting sharp edges, soft surfaces (resulting in gouging) and the friction between the surfaces prevent further or optimal packing. Interfacial modifying chemistries are capable of altering the surface of the fiber by coordination bonding, Van der Waals forces, or a combination of all three. The surface of the interfacially modified fiber behaves as a fiber formed of the non-reacted end or non-reacting end of the interfacial modifier. The coating of the interfacial modifier improves particle wetting by the polymer and as a result improves the physical association of the fiber and polymer in the formed composite leading to improved physical properties including, but not limited to, increased tensile and flexural strength, increased tensile and flexural modulus, improved notched IZOD impact and reduced coefficient of thermal expansion. In the melt, the interfacial modified coating on the fiber reduces the friction between fibers thereby preventing gouging and allowing for greater freedom of movement between fibers in contrast to fibers that have not been coated with interfacial modifier chemistry. As a result, the composite can be thermoplastically processed at greater productivity and at conditions of reduced temperature and pressure severity. The process and physical property benefits of utilizing the coated fibers in the aforementioned acceptable fiber morphology index range does not become evident until packing to a significant proportion of the maximum packing fraction; this value is typically greater than approximately 40, 50, 60, 70, 80, 90, 92 or 95 volume or weight % of the fiber phase in the composite.

In a composite, the fiber is usually much stronger and stiffer than the polymer matrix, and gives the composite its designed structural or shaped article properties. The matrix holds the fiber in an orderly high-density pattern. Because the fibers are usually discontinuous, the matrix also helps to transfer load among the non-metal, inorganic, synthetic, natural, or mineral fibers. Processing can aid in the mixing and filling of the non-metal, inorganic or mineral fibers. To aid in the mixture, an interfacial modifier can help to overcome the forces that prevent the matrix from forming a substantially continuous phase of the composite. The tunable composite properties arise from the intimate association of the fiber and the polymer obtained by the use of careful polymer processing and manufacture. We believe an interfacial modifier (IM) is an organic material that provides an exterior coating on the fiber promoting the close association of polymer and fiber. Minimal amounts of the interfacial modifier can be used including about 0.005 to 8 wt.-%, 0.01 to 6 wt. % or about 0.02 to 3 wt. %. Higher amounts of the IM are used to coat materials with increased surface morphology.

Typically, the composite materials can be manufactured using melt processing and are also utilized in product formation using melt processing. A typical thermoplastic polymer material, is combined with fiber and processed until the material attains (e.g.) a uniform density (if density is the characteristic used as a determinant). Alternatively, in the manufacture of the material, the fiber or the thermoplastic polymer may be blended with interfacial modification agents and the modified materials can then be melt processed into the material. Once the material attains a sufficient property, such as, for example, density, the material can be extruded into a product or into a raw material in the form of a pellet, chip, wafer, preform or other easily processed material using conventional processing techniques.

In the manufacture of useful products, the manufactured composite can be obtained in appropriate amounts, subjected to heat and pressure, typically in extruder useful for 3D printing (additive manufacturing), or injection molding equipment and then formed into an appropriate shape having the correct amount of materials in the appropriate physical configuration. In the appropriate product design, during composite manufacture or during product or article manufacture, a pigment or other dye material can be added to the processing equipment. One advantage of this material is that an inorganic dye or pigment can be co-processed resulting in a material that needs no exterior painting or coating to obtain an attractive, functional, or decorative appearance. The pigments can be included in the polymer blend, can be uniformly distributed throughout the material and can result in a surface that cannot chip, scar or lose its decorative appearance. One particularly important pigment material comprises titanium dioxide ($TiO_2$). This material is extremely non-toxic, is a bright white particulate that can be easily combined with the fiber and/or polymer composites to enhance the novel characteristics of the composite material and to provide a white hue to the ultimate composite material.

The manufacture of the composite materials depends on good manufacturing technique. The fiber is initially treated with an interfacial modifier by contacting the fiber with the modifier in the form of a solution of interfacial modifier on the fiber with blending and drying carefully to ensure uniform particulate or fiber coating. Interfacial modifier can also be added to fibers in bulk blending operations using high intensity Littleford or Henschel blenders. Alternatively, twin cone mixers can be followed by drying or direct addition to a screw compounding device. Interfacial modifiers may also be reacted with the particulate in aprotic solvent such as toluene, tetrahydrofuran, mineral spirits or other such known solvents.

The particulate can be combined into the polymer phase depending on the nature of the polymer phase, the filler, the particulate surface chemistry and any pigment process aid or additive present in the composite material. Titanates provide antioxidant properties and can modify or control cure chemistry. A useful titanate material is 2-propanolato, tris isooctadecanoato-O-titanium IV, an isopropyl triisostearoyl titanate. Zirconate provides excellent coating and reduces formation of off color in formulated thermoplastic materials. A useful zirconate material is neopentyl (diallyl) oxy-tri (dioctyl) phosphato-zirconate.

The composite materials having the desired physical properties can be manufactured as follows. In an embodiment, the surface of the fiber is initially prepared, the interfacial modifier coats the fiber, and the resulting product is isolated and then combined with the continuous polymer phase to affect an immiscible dispersion or association between the fiber and the polymer. Once the composite material is compounded or prepared, it is then thermoplastically formed into the desired shape of the end use article. Solution processing is an alternative that provides solvent recovery during materials processing. The materials can also be dry-blended without solvent. Blending systems such as ribbon blenders obtained from Drais Systems, high-density drive blenders available from Littleford Brothers and Henschel are possible. Further melt blending using Banberry, other single screw or twin screw compounders is also useful. When the materials are processed as a plastisol or organosol with solvent, liquid ingredients are generally charged to a processing unit first, followed by polymer, particulate and rapid agitation. Once all materials are added a vacuum can be applied to remove residual air and solvent, and mixing is continued until the product is uniform and high in density.

Dry blending is generally preferred due to advantages in cost. However certain embodiments can be compositionally unstable due to differences in fiber size. In dry blending processes, the composite can be made by first introducing the polymer, combining the polymer stabilizers, if necessary, at a temperature from about ambient to about 60° C. with the polymer, blending a particulate (modified if necessary) with the stabilized polymer, blending other process aids, interfacial modifier, colorants, indicators or lubricants followed by mixing in hot mix, transfer to storage, packaging or end use manufacture.

Interfacially modified materials can be made with solvent techniques that use an effective amount of solvent to initiate formation of a composite. When interfacial treatment is substantially complete, the solvent can be stripped. With an IM the composites can achieve the following properties:

TABLE 2

| Property | ASTM Method | Minimum Value | Range of Value | Units |
| --- | --- | --- | --- | --- |
| Tensile Strength | D638 | 35 (5 × 10$^4$) | >35 | MPa (psi) |
| Tensile Modulus | D638 | 8 (1.2 × 10$^6$) | >4 | GPa (psi) |
| Flexural Strength | D790 | 35 (5 × 10$^4$) | >35 | MPa (psi) |
| Flexural Modulus | D790 | 8 (1.2 × 10$^6$) | >4 | GPa (psi) |
| Notched IZOD | D256 | 70 (1.3) | >30 | J/m (ft lbs/in) |
| COTE | D969 | Maximum Value: 1.9 × 10$^{-5}$ (1.1 × 10$^{-5}$) | <5.4 × 10$^{-5}$ | cm/cm/° C. in/in/° F. |

Additional, the use of the IM permits an increase in the fiber loading in the composite. As the fiber content increases, the polymer content decreases. The thermal expansion of a structural member made with the disclosed material will be improved as fiber content increases, e.g., the material will have reduced coefficient of thermal expansion (COTE).

EXPERIMENTAL SECTION

Example 1

The glass fiber (Pittsburgh Plate Glass (Pittsburgh, Pa.)) is first treated with an interfacial modifier titanium IV 2-propanolato, tris isooctadecanoato-O (commercially available as KR®TTS from Kenrich). This is done by dissolving the desired amount of the interfacial modifier in a 250 ml beaker containing 50 ml of solvent (usually isopropyl, or some other, alcohol). The resulting slurry is then heated to an appropriate temperature such as 65-100° C. until the mixture can no longer be stirred and most of the solvent has been driven off. The beaker containing the glass fiber with interfacial modifier is then placed in an oven for drying at a time and temperature, such as 30 minutes at 100° C. The treated mixed particulate is then added to a 100 ml beaker containing a solution of a polymer such as THV220A dissolved in acetone. THV220A is a thermoplastic fluoropolymer of tetrafluoroethylene, hexafluoropropylene, and vinylidene fluoride available from 3M (St. Paul, Minn.). Other polymers for example PLA and PVC may also be useful depending on the function and structure of the final article or shape. The mixture is then heated to a temperature, such as, to 30° C. and continuously stirred until most of the acetone has evaporated. The composite material is then placed in a forced air oven for a time such as, 30 minutes at 100° C.

After compounding, the composite material is extruded with a 1 inch extruder and tested for various material properties. The composite has a flex modulus as measured by ASTM D790 at 77° F. (25° C.), tensile modulus as measured by ASTM D638 at 77° F. (25° C.) and a notched Izod as measured by ASTM D256 at 77° F. (25° C.) and a viscosity/torque in a Brabender mixer as measured by an appropriate ASTM protocol.

Example 2

A series of composites are made having 35-55 wt. % polyvinyl chloride and 45-65 wt. % glass fiber. The glass fiber from, for example, Pittsburgh Plate Glass (Pittsburgh, Pa.) is first treated with an interfacial modifier such as titanium IV 2-propanolato, tris isooctadecanoato-O (commercially available as Kenrich KR®TTS). This is done by placing 100 grams of the glass fiber into the beaker and then the desired amount of the interfacial modifier into the same beaker. The resulting mixture is then heated to an appropriate temperature such as 65-100° C. until the mixture is homogeneous.

The treated fiber is then added to another beaker containing an appropriate amount of polymer, for example, Geon™ Vinyl 87180. Geon™ Vinyl 87180 is a polymer consisting of vinyl chloride monomers available from PolyOne Corporation (Avon Lake, Ohio). Other polymers, such as ABS, may also be useful depending on the function and structural of the final article or shape. The mixture is then added to a twin screw extruder heated to a temperature, such as, to 195° C. and compounded.

After compounding, the composite material is extruded with a 1 inch extruder and tested for various material properties. The composite has a flex modulus as measured by ASTM D790 at 77° F. (25° C.), tensile modulus as measured by ASTM D638 at 77° F. (25° C.) and a notched Izod as measured by ASTM D256 at 77° F. (25° C.) and a viscosity/torque in a Brabender mixer as measured by an appropriate ASTM protocol.

Example 3

A series of composites are made having 30-50 wt. % Acrylonitrile Butadiene Styrene (ABS) polymer and 50-70 wt. % glass fiber. The fiber is first treated with an interfacial modifier such as titanium IV 2-propanolato, tris isooctadecanoato-O (commercially available as Kenrich KR®TTS). A 100-gram portion of the glass fiber is placed into a beaker with the desired amount of the interfacial modifier and prepared as in Examples 1 or 2.

The treated fiber is then added to another beaker containing an appropriate amount of polymer, Lustran® ABS 433. Lustran® ABS 433 is a general-purpose injection-molding grade of ABS (Acrylonitrile Butadiene Styrene). It is a high impact, high-gloss ABS. The mixture is then added to a twin screw extruder heated to a temperature, such as to 195° C. and compounded.

After compounding, the composite material is extruded with a 1 inch extruder and tested for various material properties. The composite has a flex modulus as measured by ASTM D790 at 77° F. (25° C.), tensile modulus as measured by ASTM D638 at 77° F. (25° C.) and a notched Izod as measured by ASTM D256 at 77° F. (25° C.) and a viscosity/torque in a Brabender mixer as measured by an appropriate ASTM protocol.

The data shows that the fiber polymer composites as claimed have enhanced properties of the composite such as processability, viscoelasticity, rheology, high packing fraction, and fiber surface inertness.

TABLE 3

| Ex | Polymer | Polymer Density (g/cc) | Polymer Wt. % | Polymer Vol. % | Interfacial Modifier pph | Interfacial Modifier Wt. % | Interfacial Modifier Vol. % | Coated Fiber Density (g/cc) | Coated Fiber Wt. % | Coated Fiber Vol. % | Composite Density (g/cc) |
|---|---|---|---|---|---|---|---|---|---|---|---|
| 4 | ABS* | 1.0478 | 48.41 | 70 | 1.5 | 0.76 | 1.15 | 2.605 | 51.58 | 30.00 | 1.515 |
| 5 | CPVC (powder)* | 1.4826 | 57.04 | 70 | 1.5 | 0.63 | 1.15 | 2.605 | 42.95 | 30.00 | 1.8194 |

*These material values had a different (older) sample prep method as well as modulus calculation.

TABLE 4

| EX | Composite Density (g/cc) | Tensile Strength (Mpa) ASTM D3039 | Tensile Modulus (GPa) ASTM D3039 | Flexural Strength (MPa) ASTM D790 | Flexural Modulus (GPa) ASTM D790 |
|---|---|---|---|---|---|
| 4 | 1.515 | 23.7 | 6.4 | 66.1 | 10.3 |
| 5 | 1.8194 | 29.6 | 8.4 | 66.0 | 11.5 |

Table 3 shows polymer fiber composites of the invention made in examples 3 and 4 and being made from acrylonitrile-butadiene-styrene (ABS) and chlorinated poly vinyl chloride (CPVC) and glass fiber coated with interfacial modifier (IM). Table 4 shows that the manufactured composites have suitable and acceptable physical characteristics as shown by ASTM testing for tensile strength, tensile modulus, flexural strength and flexural modulus.

Useful volume % of the fiber phase in the composite of the invention can be adjusted to above 40, 50, 60, 70, 80, or 90%, depending on the end use of the article or structural member and the required physical properties of the article or structural member, without loss of processability, viscoelasticity, rheology, high packing fraction, and fiber surface inertness of the composite.

Methods and Procedures

Application of Interfacial Modifier:

To interfacially modify at a lab scale, the interfacial modifier is first solubilized with a solvent such as IPA. The solvent/modifier mixture is applied to a fiber portion previously placed within a preparation vessel. The solvent/modifier mixture is added in enough volume to fully wet and flood the fiber. The outer part of vessel is then heated to volatize the solvent. After a sufficient time, the modified fiber becomes free flowing—an indication that they are ready for compounding and thermoplastic processing. The extruded or injection molded member can be formed as a linear member or a hollow profile.

The improved process viscosity can be seen in comparing the processing of a composite as claimed compared to a composite of uncoated fiber. The claimed materials have substantially reduced processing viscosity that is derived from the freedom of movement of the interfacially modified fiber within the polymer matrix. The IM also provides some fiber self-ordering which increases fiber packing fraction without the loss of rheology or breakage of fibers. We used a C. W. Brabender Computerized Plasti-Corder test mixer equipped with a 19.1 mm. (¾ in.) diameter extruder with a 25/1 length/diameter ratio. The extrusion screw had ten feed flights, 10 compression flights with a compression ratio of 3:1, and 5 metering flights. Operating parameters were controlled by 5 independent heating zones, four pressure transducers and a torque-measuring drive unit. Software module was used for extrusion data. The capillary die, made from #416 stainless steel, had a diameter of 2 mm and a length of 40 mm. In operation, the operating conditions were set and the fiber polymer composite was then extruded until equilibrium (constant throughput and constant die pressure) were reached. Extrusion at 40 rpm and a die pressure of about 28 Mpa were used. Brabender viscosity is reported as torque according to the appropriate ASTM protocol in N-m. The linear member can be in the form of dimensioned lumber, trim pieces, circular cross-section rod, I-beam, etc. The profile comprises an exterior wall or shell substantially enclosing a hollow interior. The interior can contain structural web providing support for the walls and can contain one fastener anchor.

The interior of the structural member is commonly provided with one or more structural webs which in a direction of applied stress supports the structure. Structural web typically comprises a wall, post, support member, or other formed structural element which increases compressive strength, torsion strength, or other structural or mechanical properties. Such structural web connects the adjacent or opposing surfaces of the interior of the structural member. More than one structural web can be placed to carry stress from surface to surface at the locations of the application of stress to protect the structural member from crushing, torsional failure or general breakage. Typically, such support webs are extruded or injection molded during the manufacture of the structural material. However, a support can be post added from parts made during separate manufacturing operations.

The internal space of the structural member can also contain a fastener anchor or fastener installation support.

Such an anchor or support means provides a locus for the introduction of a screw, nail, bolt or other fastener used in either assembling the unit or anchoring the unit to a rough opening in the commercial or residential structure. The anchor web typically is conformed to adapt itself to the geometry of the anchor and can simply comprise an angular opening in a formed composite structure, can comprise opposing surfaces having a gap or valley approximately equal to the screw thickness, can be geometrically formed to match a key or other lock mechanism, or can take the form of any commonly available automatic fastener means available to the window manufacturer from fastener or anchor parts manufactured by companies such as Amerock Corp., Illinois Tool Works and others.

The structural member can have premolded paths or paths machined into the molded thermoplastic composite for passage of door or window units, fasteners such as screws, nails, etc. Such paths can be counter sunk, metal lined, or otherwise adapted to the geometry or the composition of the fastener materials. The structural member can have mating surfaces premolded in order to provide rapid assembly with other window. Components of similar or different compositions having similarly adapted mating surfaces. Further, the structural member can have mating surfaces formed in the shell of the structural member adapted to moveable window sash or door sash or other moveable parts used in window operations.

The structural member can have a mating surface adapted for the attachment of the subfloor or base, framing studs or side molding or beam, top portion of the structural member to the rough opening. Such a mating surface can be flat or can have a geometry designed to permit easy installation, sufficient support and attachment to the rough opening. The structural member shell can have other surfaces adapted to an exterior trim and interior mating with wood trim pieces and other surfaces formed into the exposed sides of the structural member adapted to the installation of metal runners, wood trim parts, door runner supports, or other metal, plastic, or wood members commonly used in the assembly of windows and doors.

The structural members can be assembled with a variety of known mechanical fastener techniques. Such techniques include screws, nails, and other hardware. The structural members can also be joined by an insert into the hollow profile, glue, or a melt fusing technique wherein a fused weld is formed at a joint between two structural members. The structural members can be cut or milled to form conventional mating surfaces including 90° angle joints, rabbit joints, tongue and groove joints, butt joints, etc. Such joints can be bonded using an insert placed into the hollow profile that is hidden when joinery is complete. Such an insert can be glued or thermally welded into place. The insert can be injection molded or formed from similar thermoplastics and can have a service adapted for compression fitting and secure attachment to the structural member. Such an insert can project from approximately 1 to 5 inches into the hollow interior of the structural member. The insert can be shaped to form a 90° angle, a 180° extension, or other acute or obtuse angle required in the assembly of the structural member. Further, such members can be manufactured by milling the mating faces and gluing members together with a solvent, structural or hot melt adhesive. Solvent borne adhesives that can act to dissolve or soften thermoplastic present in the structural member and to promote solvent based adhesion or welding of the materials are known in polyvinyl chloride technology. In the welding technique, once the joint surfaces are formed, the surfaces of the joint can be heated to a temperature above the melting point of the composite material and while hot, the mating surfaces can be contacted in a configuration required in the assembled structure. The contacted heated surfaces fuse through an intimate mixing of molten thermoplastic from each surface. Once mixed, the materials cool to form a structural joint having strength typically greater than joinery made with conventional techniques. Any excess thermoplastic melt that is forced from the joint area by pressure in assembling the surfaces can be removed using a heated surface, mechanical routing or a precision knife cutter.

DETAILED DESCRIPTION OF THE DRAWINGS

FIG. 1 is a cross sectional view of an extruded hollow profile structural member. The member can be an interior or exterior component. The component can be a decking surface member, general purpose board, wall section, wall panel, trim, roofing section, etc. The profile 10 includes a wall 11, tongue 12 groove 13 and interior reinforcing web 15. The web 15 can have a curved shape and can be a dual member section in the form of a "Y" shaped cross section 14. The member 10 can have a surface colored or clear thin decorative cap stock 16. The interior 17 of the member 10 comprises the composite as claimed.

Figure 2:
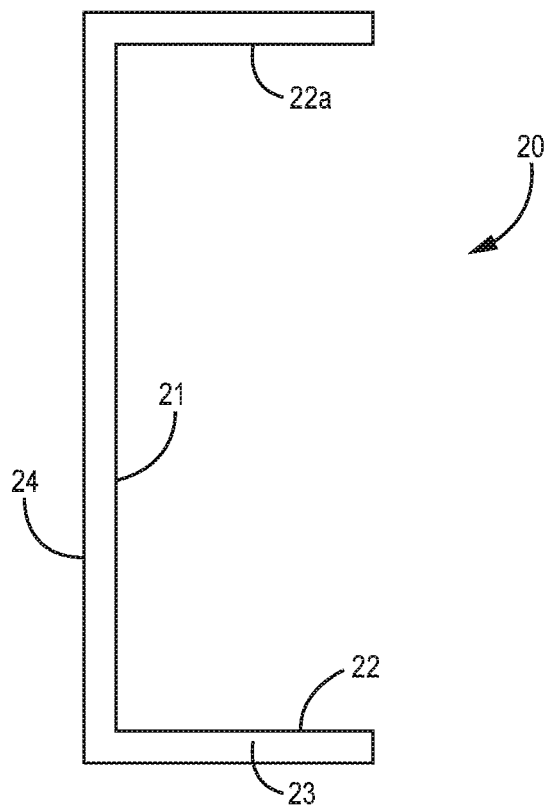
FIG. 2 shows a perspective view of an extruded C shaped structural member profile.

FIG. 2 shows a cross sectional view of an extruded C shaped structural member profile. The C shaped member 20 has a wall section 21 and extending portions 22 and 22a formed at right angles to the wall 21. The interior 23 of the member 20 comprises the composite as claimed. The member 20 can have a surface colored or clear thin decorative cap stock 24.

Figure 3:
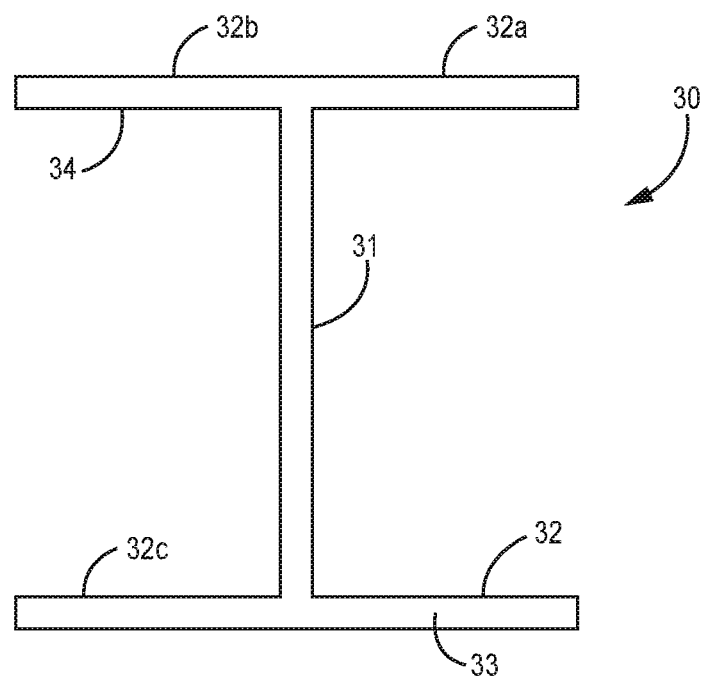
FIG. 3 shows a perspective view of an extruded I Beam shaped structural member profile.

FIG. 3 shows a cross sectional view of an extruded I Beam shaped structural member profile. The I beam shaped member 30 has a wall section 31 and extending portions 32, 32a, 32b and 32c formed at right angles to the wall 21. The interior 33 of the member 30 comprises the composite as claimed. The member 30 can have a surface colored or clear thin decorative cap stock 34.

The structural member can have a wall thickness of at least 0.5 mm, can be about 0.8 mm to 5 cm or can be about 1 mm to 4 mm in thickness and can be manufactured using any typical thermoplastic forming operation. Preferred forming processes include extrusion and injection molding.

While the above specification shows an enabling disclosure of the composite technology of the invention, other embodiments of the invention may be made with the claimed materials. Accordingly, the invention is embodied in the claims hereinafter appended.

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims.

We claim:

1. A composite comprising a discontinuous phase dispersed in a continuous polymer phase:
 (a) the discontinuous phase comprising a fiber, the fiber free of a particulate, the majority of the fiber having a length greater than about 1 mm, a diameter greater than about 0.8 microns and an aspect ratio greater than about 90, the fiber having an exterior coating comprising an interfacial modifier; and (b) the continuous phase comprising a vinyl polymer or condensation polymer; wherein the discontinuous fiber phase comprises at least one packing fraction of the fiber phase greater than about 40 wt. % of the composite and the composite has a flexural modulus as measured by ASTM D790 of greater than 8 GPa.

2. The composite of claim 1 wherein the fiber comprises a natural or synthetic fiber.

3. The composite of claim 1 wherein the fiber comprises a glass or carbon.

4. The composite of claim 1 wherein the fiber comprises a cellulosic fiber or flax.

5. The composite of claim 1 wherein the polymer comprises a vinyl polymer.

6. The composite of claim 1 wherein the discontinuous phase comprises about 90 to 40 weight-% of the fiber.

7. The composite of claim 1 wherein the interfacial modifier is present in an amount of about 0.005 to 8 wt.-% in the composite.

8. The composite of claim 1 wherein the fiber comprises a combination of a cellulosic fiber and a glass fiber.

9. The composite of claim 8 wherein the cellulosic fiber is a wood fiber.

10. The composite of claim 8 wherein there is a major proportion of cellulosic fiber and a minor proportion of glass fiber.

11. The composite of claim 8 wherein there are at least two packing fractions of the fiber comprising the cellulosic fiber and the glass fiber.

12. The composite of claim 8 wherein the packing fraction of the fiber comprising the cellulosic fiber is greater than the packing fraction comprising the glass fiber.

* * * * *